United States Patent
Lee et al.

(10) Patent No.: US 12,373,157 B2
(45) Date of Patent: Jul. 29, 2025

(54) TERMINAL DEVICE AND MIRRORING METHOD PERFORMED THEREBY

(71) Applicant: SAMSUNG ELECTRONICS CO., LTD., Suwon-si (KR)

(72) Inventors: Jongin Lee, Suwon-si (KR); Yongwoo Shin, Suwon-si (KR); Sehyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/394,738

(22) Filed: Dec. 22, 2023

(65) Prior Publication Data
US 2024/0184502 A1    Jun. 6, 2024

Related U.S. Application Data

(63) Continuation of application No. PCT/KR2023/019881, filed on Dec. 5, 2023.

(30) Foreign Application Priority Data

Dec. 5, 2022 (KR) ............ 10-2022-0168100

(51) Int. Cl.
G06F 3/14      (2006.01)

(52) U.S. Cl.
CPC .......... *G06F 3/1454* (2013.01); *G06F 3/1407* (2013.01)

(58) Field of Classification Search
CPC ................................................ G06F 3/1454
USPC ......................................................... 345/173
See application file for complete search history.

(56) References Cited

U.S. PATENT DOCUMENTS

| | | |
|---|---|---|
| 10,459,511 B2 | 10/2019 | Lee et al. |
| 10,560,832 B2 | 2/2020 | Kang |
| 2016/0174277 A1 | 6/2016 | Yoon et al. |
| 2017/0060518 A1* | 3/2017 | Hong .......... G06F 3/0482 |
| 2019/0056904 A1* | 2/2019 | Li .............. G09G 5/006 |
| 2020/0053417 A1 | 2/2020 | Choi et al. |

(Continued)

FOREIGN PATENT DOCUMENTS

| | | |
|---|---|---|
| KR | 10-2013-0060072 A | 6/2013 |
| KR | 10-2013-0123216 A | 11/2013 |
| KR | 10-1456935 B1 | 11/2014 |

(Continued)

OTHER PUBLICATIONS

International Search Report (PCT/ISA/210) and Written Opinion (PCT/ISA/237) issued Mar. 6, 2024 by the International Searching Authority in International Patent Application No. PCT/KR2023/019881.

*Primary Examiner* — Calvin C Ma
(74) *Attorney, Agent, or Firm* — Sughrue Mion, PLLC

(57) ABSTRACT

A mirroring method performed by a source terminal, includes: identifying, according to a first communication protocol, a first terminal having a mirroring function that is deactivated; outputting a terminal list including identification information of the first terminal; based on the first terminal being selected from the terminal list, transmitting a request for activation of the mirroring function to the first terminal according to the first communication protocol; and transmitting, according to a second communication protocol, content to the first terminal with the mirroring function that is activated in response to the request for the activation.

23 Claims, 14 Drawing Sheets

(56) References Cited

U.S. PATENT DOCUMENTS

2020/0379707 A1   12/2020  Kwon et al.
2022/0239718 A1*  7/2022  Song .................. H04L 65/1069

FOREIGN PATENT DOCUMENTS

| KR | 10-2016-0016335 A | 2/2016 |
| KR | 10-2016-0020081 A | 2/2016 |
| KR | 10-2016-0071826 A | 6/2016 |
| KR | 10-2018-0039341 A | 4/2018 |
| KR | 10-2020-0022040 A | 3/2020 |
| KR | 10-2020-0136256 A | 12/2020 |
| KR | 10-2389038 B1 | 4/2022 |
| KR | 10-2022-0099730 A | 7/2022 |

* cited by examiner

TERMINAL DEVICE AND MIRRORING METHOD PERFORMED THEREBY

CROSS-REFERENCE TO RELATED APPLICATIONS

This application is a continuation of International Application No. PCT/KR2023/019881, filed on Dec. 5, 2023, which is based on and claims priority to Korean Patent Application No. 10-2022-0168100, filed on Dec. 5, 2022 in the Korean Intellectual Property Office, the disclosures of each of which are incorporated by reference herein their entirety.

BACKGROUND

1. Field

The disclosure relates to a terminal device and a mirroring method performed thereby, and more particularly, to a device and method for mirroring content output from a source terminal onto a sink terminal.

2. Description of Related Art

Due to the development of wired and wireless communication networks, electronic devices capable of outputting content for users may be interconnected to one another.

Electronic devices are capable of transmitting and receiving various types of data to and from one another over wired and wireless communication networks. For example, one electronic device may remotely control another electronic device, and one electronic device may share the same content with another electronic device for simultaneous display. Mirroring technology is required for remote control or content sharing between electronic devices.

Mirroring technology is a technology that allows devices having displays to share screen data with each other. The mirroring technology may be embedded in electronic devices capable of outputting content on displays, such as portable computers (e.g., laptops, netbooks, or tablet PCs), portable terminals (e.g., smartphones or personal digital assistants (PDAs)), smart TVs, etc.

Display as a Service (Daas), Miracast, Airplay, etc. have been developed as technologies for mirroring services.

Generally, users want to share a screen of a device having a small display (e.g., a mobile phone, a tablet PC, etc.) on a device having a large display (e.g., a TV) to view content on the large display.

In an example, users may need to share a screen of a device having a large display on a device having a small display for reasons such as mobility. However, devices with small displays often have a mirroring function deactivated since most of the time, users want to share a screen of a device having a small display on a device having a large display.

In a case where a mirroring function of a device that is unlikely to be used for mirroring is activated in advance, battery consumption will increase, and a user may feel inconvenienced or uncomfortable when a terminal owned by the user that is not intended to be used for sharing content is included in a list of connectable devices.

Therefore, a method of more easily performing mirroring to a device with a mirroring function deactivated is required.

SUMMARY

According to an aspect of the disclosure, a mirroring method performed by a source terminal, includes: identifying, according to a first communication protocol, a first terminal having a mirroring function that is deactivated; outputting a terminal list including identification information of the first terminal; based on the first terminal being selected from the terminal list, transmitting a request for activation of the mirroring function to the first terminal according to the first communication protocol; and transmitting, according to a second communication protocol, content to the first terminal with the mirroring function that is activated in response to the request for the activation.

The identifying the first terminal may include identifying the first terminal having the mirroring function based on capability information that is received from the first terminal according to the first communication protocol.

The mirroring method may further include identifying, according to the second communication protocol, a second terminal having the mirroring function that is activated, and the outputting the terminal list may include outputting the terminal list including the identification information of the first terminal and identification information of the second terminal.

The mirroring method may further include receiving account information of the first terminal from the first terminal according to the first communication protocol, and the outputting the terminal list may include, based on the account information of the first terminal corresponding to account information of the source terminal, outputting the identification information of the first terminal differently than the identification information of the second terminal such that a display of the identification information of the first terminal is different from a display of the identification of the second terminal.

The identification information of the first terminal may be placed in the terminal list such that the identification information of the first terminal has a higher priority than the identification information of the second terminal.

The first terminal may include a plurality of first terminals, and the mirroring method may further include receiving one or more pieces of account information from the plurality of first terminals according to the first communication protocol, and the outputting the terminal list may include outputting identification information of a first terminal, from among the plurality of first terminals, having account information corresponding to the account information of the source terminal differently than identification information of a first terminal, from among the plurality of first terminals, having account information not corresponding to the account information of the source terminal such that a display of the identification information of the first terminal having the corresponding account information is different from a display of the identification of the first terminal that does not have the corresponding account information.

The transmitting the request for the activation of the mirroring function to the first terminal may include: receiving the account information of the first terminal from the first terminal according to the first communication protocol, and based on the account information of the first terminal corresponding to the account information of the source terminal, transmitting the request for the activation of the mirroring function to the first terminal.

The transmitting the request for the activation of the mirroring function to the first terminal may include, based on the account information of the first terminal not corresponding to the account information of the source terminal, transmitting a request for consent to the activation of the mirroring function to the first terminal, and the mirroring function of the first terminal is activated according to an approval by a user of the first terminal.

The transmitting the request for the activation of the mirroring function to the first terminal may include, based on the first terminal being connected to a same network as the source terminal, transmitting the request for the activation of the mirroring function to the first terminal.

The mirroring method may further include, based on a mirroring connection between the source terminal and the first terminal being terminated, transmitting a request for deactivation of the mirroring function to the first terminal according to the first communication protocol.

The mirroring connection may be terminated based on an application used to output the content being terminated on the source terminal, based on an application used to output the content being terminated on the first terminal, or based on the mirroring function being deactivated on the source terminal.

According to an aspect of the disclosure, a non-transitory computer-readable medium has instructions stored therein, which when executed by a processor cause the processor to execute the mirroring method.

According to an aspect of the disclosure, a mirroring method performed by a sink terminal, includes: transmitting capability information of the sink terminal to a source terminal according to a first communication protocol; based on the sink terminal having a mirroring function, receiving a request for activation of the mirroring function from the source terminal according to the first communication protocol; activating the mirroring function based on the request for the activation; receiving content from the source terminal according to a second communication protocol; and outputting the content.

The mirroring method may further include, based on a request from the source terminal, transmitting account information set on the sink terminal to the source terminal.

According to an aspect of the disclosure, a source terminal for performing mirroring, includes: a first communication module configured to identify, according to a first communication protocol, a first terminal having a mirroring function that is deactivated; an output module configured to output a terminal list including identification information of the first terminal; and a second communication module configured to perform communication according to a second communication protocol, wherein the first communication module may be further configured to, based on the first terminal being selected from the terminal list, transmit a request for activation of the mirroring function to the first terminal according to the first communication protocol, and the second communication module may be further configured to transmit, according to the second communication protocol, content to the first terminal having the mirroring function that is activated in response to the request for the activation.

The first communication module may be further configured to identify the first terminal having the mirroring function based on capability information received from the first terminal.

The second communication module may be further configured to identify, according to the second communication protocol, a second terminal having the mirroring function that is activated, and the output module may be further configured to output the terminal list including the identification information of the first terminal and identification information of the second terminal.

The first communication module may be further configured to receive account information from the first terminal according to the first communication protocol, and the output module may be further configured to, based on the account information of the first terminal corresponding to account information of the source terminal, output the identification information of the first terminal differently than the identification information of the second terminal.

The first terminal may include a plurality of first terminals, the first communication module may be further configured to receive one or more pieces of account information from the plurality of first terminals according to the first communication protocol, and the output module may be further configured to output identification information of a first terminal, from among the plurality of first terminals, having account information corresponding to the account information of the source terminal differently than identification information of a first terminal, from among the plurality of first terminals, having account information not corresponding to the account information of the source terminal such that a display of the identification information of the first terminal having the corresponding account information is different from a display of the identification of the first terminal that does not have the corresponding account information.

The first communication module may be further configured to receive the account information from the first terminal according to the first communication protocol, and based on the account information of the first terminal corresponding to the account information of the source terminal, transmit the request for the activation of the mirroring function to the first terminal.

DETAILED DESCRIPTION

Figure 1:
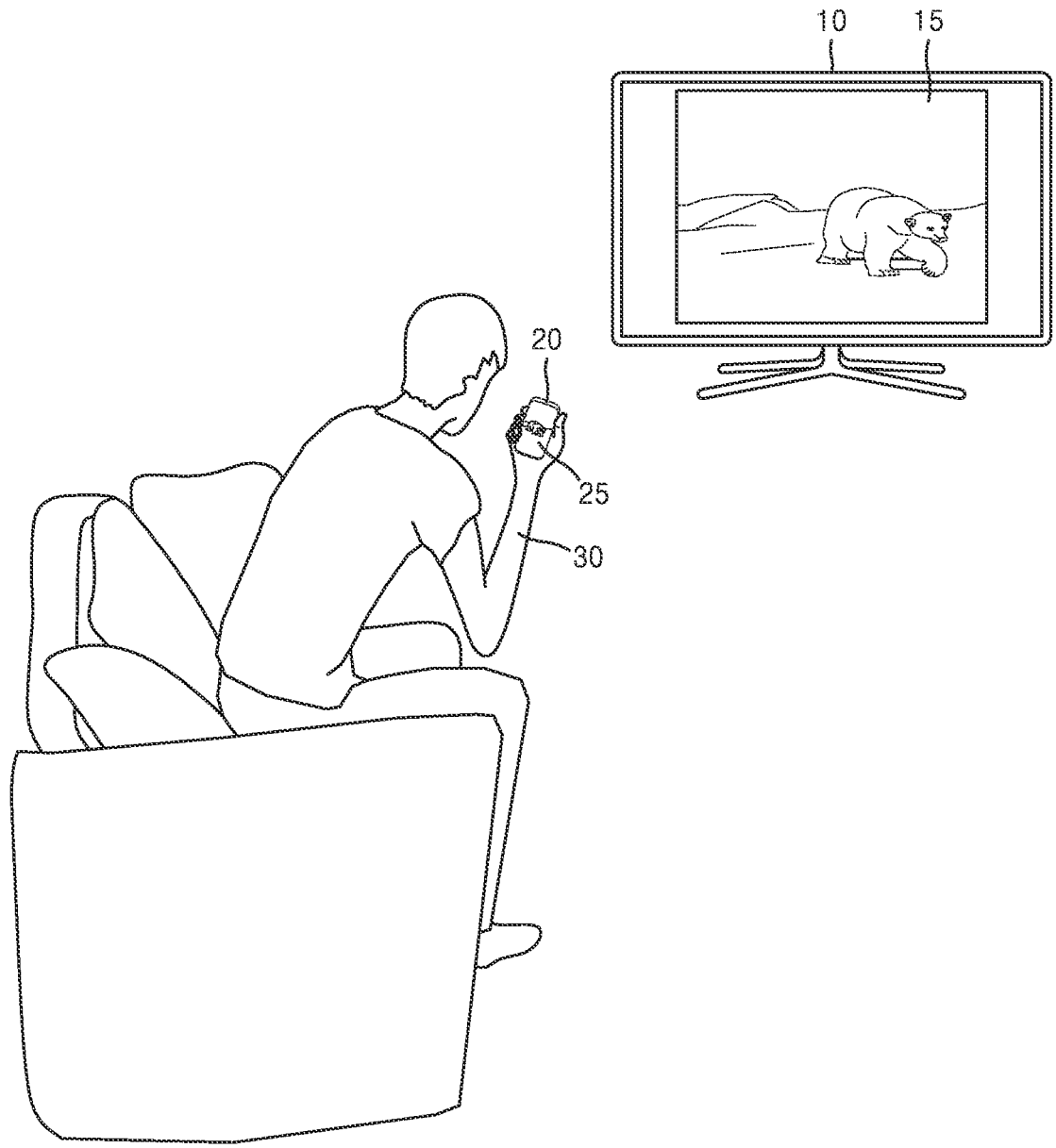
FIG. 1 is a diagram illustrating mirroring technology according to an embodiment of the disclosure.

A mirroring method performed by a source terminal according to an embodiment of the disclosure may include identifying, according to a first communication protocol, a first terminal with a mirroring function deactivated.

The mirroring method performed by the source terminal according to the embodiment of the disclosure may include outputting a terminal list including identification information of the first terminal.

The mirroring method performed by the source terminal according to the embodiment of the disclosure may include, when the first terminal is selected from the terminal list, transmitting a request for activation of the mirroring function to the first terminal according to the first communication protocol.

The mirroring method performed by the source terminal according to the embodiment of the disclosure may include transmitting, according to a second communication protocol, content to the first terminal with the mirroring function activated in response to the request for the activation.

Because the disclosure may be subject to various modifications and have numerous embodiments, particular embodiments of the disclosure are illustrated in the drawings and will be described in detail in the detailed description. However, the disclosure is not intended to be limited to particular embodiments thereof, and it should be understood that the disclosure covers all modifications, equivalents, and alternatives included in the spirit and technical scope of numerous embodiments thereof.

In describing an embodiment of the disclosure, related known technologies will not be described in detail when it is determined that the detailed descriptions may unnecessarily obscure the essence of the disclosure. In addition, numbers (e.g., first, second, etc.) used in the description of the specification are merely identifying symbols for distinguishing one component from another component.

Throughout the disclosure, the expression "at least one of a, b or c" indicates only a, only b, only c, both a and b, both a and c, both b and c, or all of a, b, and c.

In the disclosure, it should be understood that when a component is referred to as being "connected" or "coupled" to another component, the component may be directly connected or coupled to the other component, but may also be connected or coupled to the other component via another intervening component therebetween unless there is a particular description contrary thereto.

In the disclosure, for an element expressed as a 'unit,' a 'module,' or the like, two or more elements may be combined into a single element, or a single element may be divided into two or more elements according to subdivided functions. Furthermore, each element to be described below may further perform, in addition to its main functions, some or all of functions performed by another element, and some of the main functions of each element may be performed entirely by another component.

In the disclosure, a 'user' may refer to a person who controls functions of a terminal device via a control device (e.g., a keyboard, mouse, remote control, etc.) The user may include a viewer, an administrator, or an installation engineer.

As used herein, a 'source terminal' may refer to a terminal that provides content via a mirroring function, and a 'sink terminal' may refer to a terminal that receives content via the mirroring function.

As used herein, an 'activated terminal' may refer to a terminal with a mirroring function activated, and a 'deactivated terminal' may refer to a terminal with the mirroring function deactivated.

In the disclosure, 'a mirroring function of a terminal is activated' may mean that the mirroring function built into the terminal is in an on state, and 'a mirroring function of a terminal is deactivated' may mean that the mirroring function built into the terminal is in an off state.

FIG. 1 is a diagram for describing mirroring technology according to an embodiment of the disclosure.

In FIG. 1, a source terminal may be a smart TV 10 that a user 30 is watching, and a sink terminal may be a smartphone 20 held by the user 30.

The user 30 may use a mirroring service provided via the smart TV 10 and the smartphone 20 to experience content 15 output from the smart TV 10, such as movies, dramas, photos, music, or any other suitable content, on the smartphone 20. In this case, the smart TV 10 may be connected to the smartphone 20 via a certain wired or wireless network.

Through a mirroring connection between the smart TV 10 and the smartphone 20, the content 15 output from a display of the smart TV 10 may be transmitted to the smartphone 20, and content 25 may also be output on a display of the smartphone 20. For example, the user 30 may share movie content being played via the display of the smart TV 10 to the smartphone 20 to watch the movie content via the display of the smartphone 20. In an example, the smart TV 10 may initiate the mirroring function such that content output from the smart TV 10 is shared and displayed on the smartphone 20. In an example, the smartphone 20 may initiate the mirroring function such that content output from the smartphone 20 is shared and displayed on the smart TV 10.

In an example, a mirroring connection is established and maintained between the smart TV 10 and the smartphone 20 to use the mirroring function. Furthermore, in an example, to establish the mirroring connection between the smart TV 10 and the smartphone 20, a mirroring function of each of the smart TV 10 and the smartphone 20 is activated.

An exemplary process in which the user 30 uses a mirroring function via the smart TV 10 and the smartphone 20 is described.

When the user 30 activates a mirroring function of the smart TV 10, the smart TV 10 may search for a terminal with a mirroring function activated according to a predetermined communication protocol. The smart TV 10 may then output a list of found terminals on the display, and the user 30 may select the smartphone 20 from the list of terminals. The smart TV 10 requests a mirroring connection from the smartphone 20, and when the mirroring connection is established between the smart TV 10 and the smartphone 20, the user 30 may experience the content 15 output from the smart TV 10 on the smartphone 20.

In order for the smartphone 20 to be discovered by the smart TV 10, a mirroring function of the smartphone 20 needs to be activated. However, as described above, for a mobile terminal with a small display, the mirroring function is often deactivated due to low frequency of usage of the mirroring function on smaller devices as well as to conserve battery power.

When the mirroring function of the smartphone 20 is deactivated, the user 30 needs to manually activate the mirroring function of the smartphone 20, and thus, experiences inconvenience due to the manual activation.

In an embodiment of the disclosure, the inconvenience to the user 30 may be minimized by automatically activating the mirroring function of the smartphone 20 when the mirroring function is deactivated. In an example, the automatic activation of the mirroring function includes activating the mirroring function without manual user input. Furthermore, in a settings configuration, the user may configure one or more parameters such that the feature of manual activation of the mirroring function is enabled.

A configuration of a source terminal and a sink terminal according to an embodiment of the disclosure is described with reference to FIG. 2.

Figure 2:
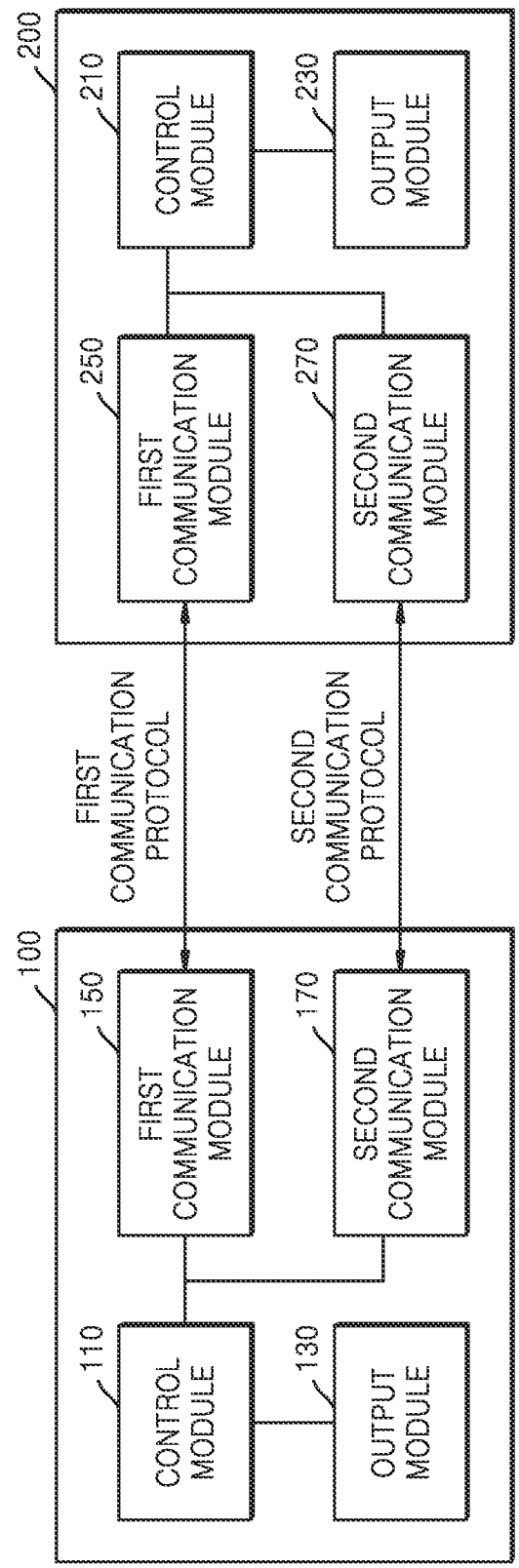
FIG. 2 is a block diagram of a configuration of a source terminal and a sink terminal according to an embodiment of the disclosure.

FIG. 2 is a block diagram of a configuration of a source terminal 100 and a sink terminal 200 according to an embodiment of the disclosure.

Referring to FIG. 2, the source terminal 100 may include a control module 110, an output module 130, a first communication module 150, and a second communication module 170. The sink terminal 200 may include a control module 210, an output module 230, a first communication module 250, and a second communication module 270.

The control module 110 of the source terminal 100 may control operations of the output module 130, the first communication module 150, and the second communication module 170. The control module 110 may operate according to at least one instruction stored in a memory.

The control module 210 of the sink terminal 200 may control operations of the output module 230, the first communication module 250, and the second communication module 270. The control module 210 may operate according to at least one instruction stored in the memory.

The control module 110, the first communication module 150, and the second communication module 170 may be implemented as one or more processors or circuitry configured to perform the functions of these modules. Furthermore, the control module 210, the first communication module 250, and the second communication module 270 may be implemented as one or more processors or circuitry configured to perform the functions of these modules.

Although FIG. 2 illustrates that the first communication module 150 and the second communication module 170 are separate components, in an embodiment of the disclosure, the first communication module 150 and the second communication module 170 may be implemented as a single communication module. Furthermore, although FIG. 2 shows that the first communication module 250 and the second communication module 270 are separate components, in an embodiment of the disclosure, the first communication module 250 and the second communication module 270 may be implemented as a single communication module.

The output module 130 of the source terminal 100 may output certain content.

The output module 230 of the sink terminal 200 may output content provided by the source terminal 100 via a mirroring function.

In an embodiment of the disclosure, the output modules 130 and 230 may each include at least one of a display for outputting visual content (e.g., a video) or a speaker for outputting auditory content (e.g., audio).

The first communication modules 150 and 250 may communicate with each other according to a first communication protocol, and the second communication modules 170 and 270 may communicate with each other according to a second communication protocol.

In an embodiment of the disclosure, the first communication module 150 of the source terminal 100 may transmit and receive data to and from the first communication module 250 of the sink terminal 200 according to the first communication protocol, and the second communication module 170 of the source terminal 100 may transmit and receive data to and from the second communication module 270 of the sink terminal 200 according to the second communication protocol.

A communication protocol may refer to formats and/or a set of rules for messages transmitted and received based on a predetermined communication method.

The first communication protocol may be used to discover a terminal in which the mirroring function is deactivated and activate the mirroring function of this terminal.

The second communication protocol may be used to discover a terminal in which the mirroring function is activated and establish and maintain a mirroring connection with this terminal. In an embodiment of the disclosure, the second communication protocol may be a communication protocol used for a known mirroring function.

In an embodiment of the disclosure, a communication method for the first communication protocol may be different from a communication method for the second communication protocol. For example, the first communication protocol may be based on Bluetooth Low Energy (BLE) communication, and the second communication protocol may be based on Wi-Fi Direct (WFD) communication.

In an embodiment of the disclosure, a frequency band for the first communication protocol may be different from a frequency band for the second communication protocol. For example, the first communication protocol may be based on a predetermined first frequency band, and the second communication protocol may be based on a predetermined second frequency band that is higher or lower than the first frequency band.

In an embodiment of the disclosure, the sink terminal 200 may be an activated terminal (e.g., terminal in which mirroring function is activated) or a deactivated terminal (e.g., terminal in which mirroring function is not activated), as described below.

In an embodiment of the disclosure, the deactivated terminal may include the control module 210, the output module 230, the first communication module 250, and the second communication module 270 illustrated in FIG. 2.

In an embodiment of the disclosure, the activated terminal may include the control module 210, the output module 230, and the second communication module 270, but may not include the first communication module 250 illustrated in FIG. 2. For example, the activated terminal may not be configured to exchange capability information with another device via the first communication protocol.

The source terminal 100 may search for a terminal capable of a mirroring connection, based on the first communication protocol and the second communication protocol, as described with reference to FIG. 3.

Figure 3:
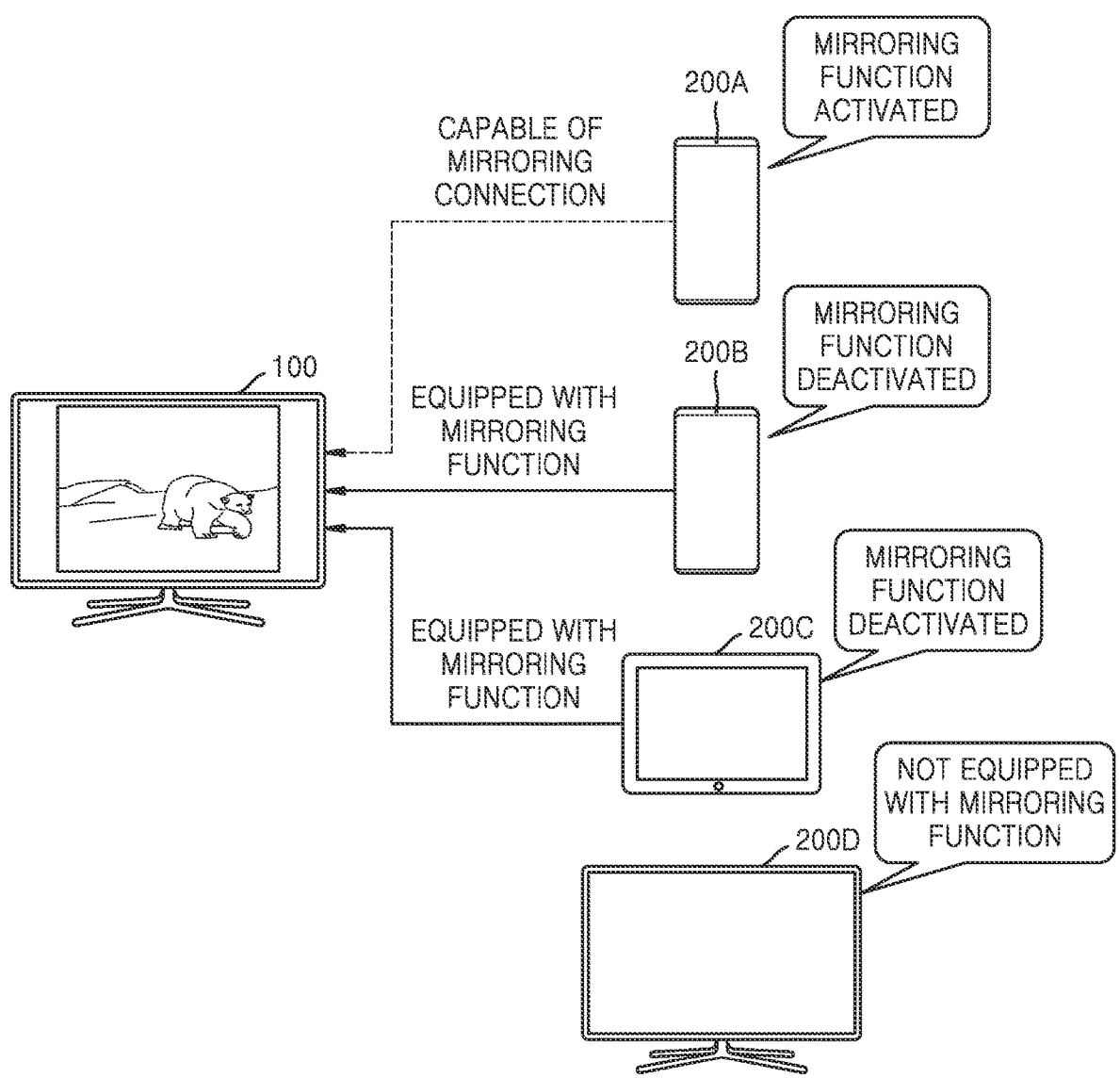
FIG. 3 is a diagram illustrating a method, performed by a source terminal, of searching for a terminal capable of a mirroring connection, according to an embodiment of the disclosure.

FIG. 3 is a diagram illustrating a method, performed by a source terminal 100, of searching for a terminal capable of a mirroring connection, according to an embodiment of the disclosure.

It is assumed that four terminals, for example, terminal A 200A, terminal B 200B, terminal C 200C, and terminal D 200D, are located in the vicinity of the source terminal 100.

Referring to FIG. 3, a mirroring function of the terminal A 200A may be activated, and mirroring functions of the terminal B 200B and terminal C 200C may be deactivated. In addition, the terminal D 200D may not be equipped with a mirroring function.

In an example, the terminal A 200A may transmit, to the source terminal 100, a message indicating that a mirroring connection is possible according to the second communication protocol. The terminal A 200A may broadcast the message that a mirroring connection is possible according to the second communication protocol, and the source terminal 100 may receive the message broadcast by the terminal A 200A to recognize that the mirroring function is activated on the terminal A 200A.

In an example, the terminal B 200B and the terminal C 200C may respectively transmit messages indicating their respective capability information to the source terminal 100 according to the first communication protocol. The messages indicating capability information may include information indicating that the terminal B 200B and the terminal C 200C are equipped with a mirroring function.

The terminal B 200B and the terminal C 200C may respectively broadcast messages indicating capability information according to the first communication protocol, and the source terminal 100 may receive the messages broadcast by the terminal B 200B and the terminal C 200C to recognize that the terminal B 200B and the terminal C 200C are each equipped with a mirroring function but have the mirroring function deactivated.

Because the terminal D 200D is not equipped with a mirroring function, the terminal D 200D may not transmit a message related to mirroring to the source terminal 100.

FIG. 3 shows that the message from the terminal A 200A is transmitted to the source terminal 100 as indicated by a dashed line, and the messages from the terminal B 200B and the terminal C 200C are transmitted to the source terminal 100 as indicated by solid lines. In an example, dashed line may represent communication according to the second communication protocol, and the solid line may represent communications according to the first communication protocol.

As described above, because mirroring functions of two terminals need to be activated to establish a mirroring connection between the two terminals, the terminal A 200A corresponding to an activated terminal may use the second communication protocol to establish the mirroring connection with another terminal (e.g., source terminal 100) such that the mirroring function may be performed between the two connected terminals.

The terminal B 200B and the terminal C 200C corresponding to deactivated terminals may each notify the source terminal 100 that they are equipped with a mirroring function according to a protocol different from the second communication protocol, (e.g., according to the first communication protocol).

The source terminal 100 may recognize the terminal A 200A corresponding to the activated terminal and the terminal B 200B and the terminal C 200C corresponding to the deactivated terminals as being terminals capable of a mirroring connection, and output a terminal list including pieces of identification information respectively regarding the terminal A 200A, the terminal B 200B, and the terminal C 200C.

Figure 4:
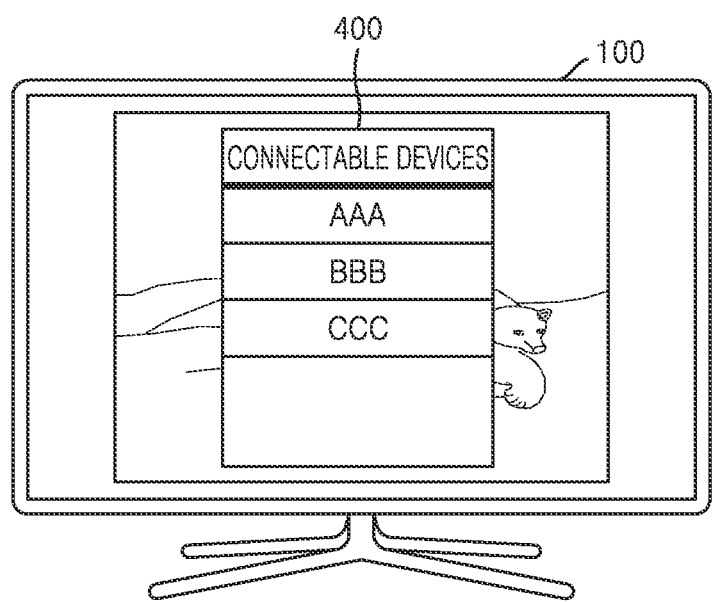
FIG. 4 illustrates a terminal list output on a source terminal, according to an embodiment of the disclosure.

FIG. 4 illustrates a terminal list 400 output on a source terminal 100, according to an embodiment of the disclosure.

Referring to FIG. 4, the source terminal 100 may output, on a display, the terminal list 400 including AAA, which is identification information of the terminal A 200A, BBB, which is identification information of the terminal B 200B, and CCC, which is identification information of the terminal C 200C.

In an embodiment of the disclosure, the source terminal 100 may output, as a voice, via the speaker, the terminal list 400 including the identification information of the terminal A 200A, the identification information of the terminal B 200B, and the identification information of the terminal C 200C.

Because the terminal D 200D is not equipped with a mirroring function, the terminal list 400 does not include identification information of the terminal D 200D. In an example, the terminal list 400 may display terminal D 200D with an indicator indicating that terminal D 200D is not equipped with the mirroring function.

The source terminal 100 may establish a mirroring connection with a terminal selected by the user from the terminal list 400 and transmit content (e.g., screen data) to the terminal with which the mirroring connection is established.

In an embodiment of the disclosure, when the terminal A 200A is selected from the terminal list 400, the source terminal 100 may establish a mirroring connection with the terminal A 200A according to the second communication protocol, and transmit content to the terminal A 200A.

In an embodiment of the disclosure, when the terminal B 200B or the terminal C 200C is selected from the terminal list 400, a mirroring function of the terminal B 200B or the terminal C 200C needs to be activated because the mirroring function in these devices is deactivated.

In an example, in order to change settings of the terminal B 200B and the terminal C 200C, the terminal B 200B and the terminal C 200C need to be recognized as being related to the source terminal 100. This relation may need to be established since it may go against a user's will for the source terminal 100 to automatically change settings of a terminal that is completely unrelated to the source terminal 100. For example, the user may be a visitor of another household, where only the devices of the family members of that household are related to the source terminal 100.

In an example, the source terminal 100 may respectively obtain pieces of account information from the terminal B 200B and the terminal C 200C, and determine, based on the obtained pieces of account information, whether the terminal B 200B and the terminal C 200C are each related to the source terminal 100.

Figure 5:
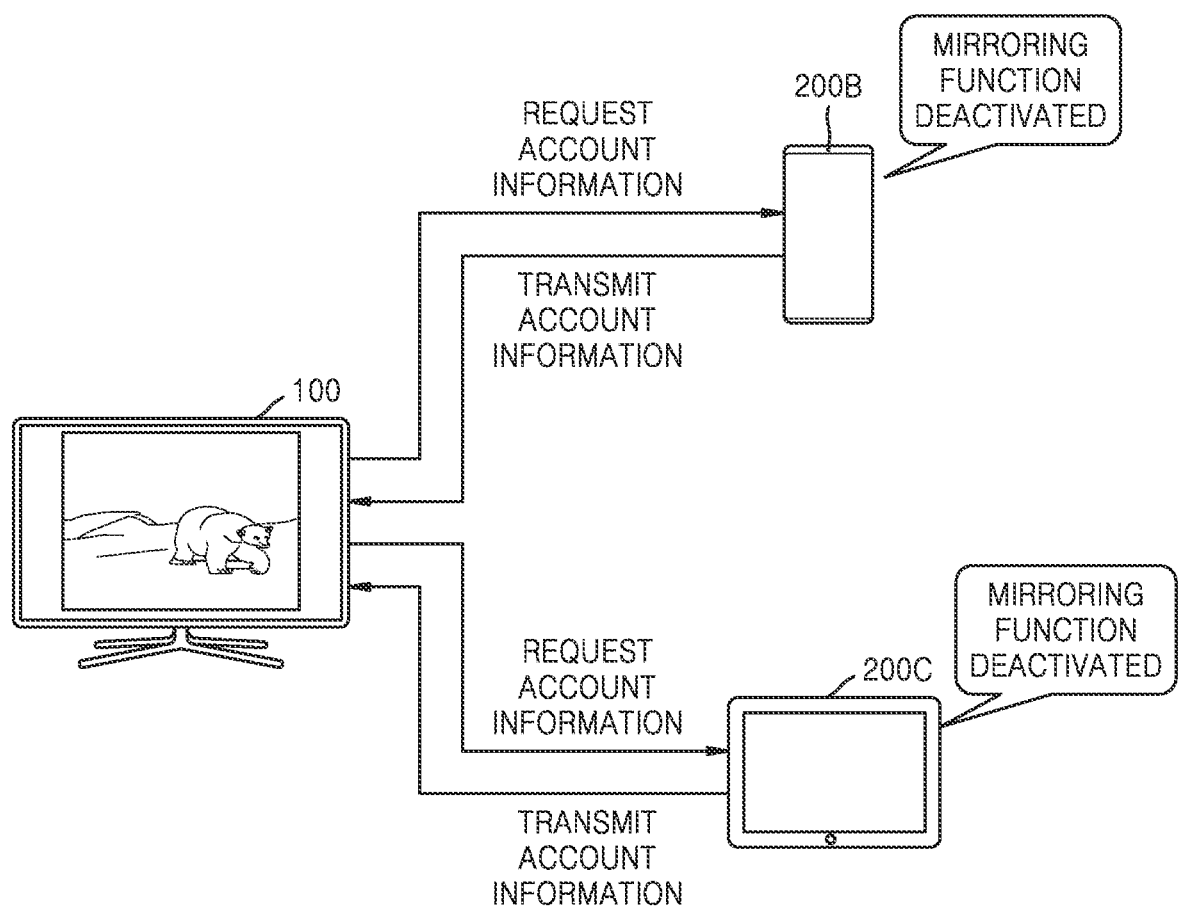
FIG. 5 is a diagram illustrating a process, performed by a source terminal, of checking account information of a deactivated terminal, according to an embodiment of the disclosure.

FIG. 5 is a diagram illustrating a process, performed by the source terminal 100, of checking account information of a deactivated terminal, according to an embodiment of the disclosure.

Referring to FIG. 5, the source terminal 100 may transmit messages requesting account information respectively to terminal B 200B and terminal C 200C according to the first communication protocol. The terminal B 200B and the terminal C 200C may both transmit their account information to the source terminal 100 according to the first communication protocol.

Account information may be user identification information set on a terminal to identify a user. For example, the account information may include a user's email address set on the terminal.

The source terminal 100 may determine whether the pieces of account information received from the terminal B 200B and the terminal C 200C each correspond to account information of the source terminal 100.

In an embodiment of the disclosure, when account information received from the terminal B 200B or the terminal C 200C corresponds to the account information of the source terminal 100, the source terminal 100 may determine that the terminal B 200B or the terminal C 200C is related to the source terminal 100.

For example, when the account information corresponds to an email address, and an email address received from the terminal B 200B or the terminal C 200C is the same as an email address set on the source terminal 100, the source terminal 100 may determine that the terminal B 200B or terminal C 200C is related to the source terminal 100.

Furthermore, for example, when the email address received from the terminal B 200B or the terminal C 200C is used by a user of the email address set on the source terminal 100, the source terminal 100 may determine that the terminal B 200B or the terminal C 200C is related to the source terminal 100.

In an example, when a user of the email address received from the terminal B 200B or the terminal C 200C belongs to the same group (e.g., a family group or company group, etc.) as the user of the email address of the source terminal 100, the source terminal 100 may determine that the terminal B 200B or the terminal C 200C is related to the source terminal 100.

The timing in which the source terminal 100 transmits the messages requesting account information to the terminal B 200B and the terminal C 200C, and receives the pieces of account information from the terminal B 200B and the terminal C 200C may be determined in various ways.

For example, when it is determined during the search process described with reference to FIG. 3 that the terminal B 200B and the terminal C 200C are equipped with a mirroring function, the source terminal 100 may transmit messages requesting their account information respectively to the terminal B 200B and the terminal C 200C.

Furthermore, for example, when the terminal B 200B or the terminal C 200C is selected by the user from the terminal list shown in FIG. 4, the source terminal 100 may transmit a message requesting account information to the terminal B 200B or the terminal C 200C selected by the user.

In an embodiment of the disclosure, when the account information of the terminal B 200B corresponds to the account information of the source terminal 100, and the account information of the terminal C 200C does not correspond to the account information of the source terminal 100, the source terminal 100 may output the account information of the terminal B 200B in a different manner than the account information of the terminal C 200C when outputting the terminal list.

Furthermore, in an embodiment of the disclosure, when outputting the terminal list, the source terminal 100 may output the account information of the terminal B 200B, which is recognized as being related to the source terminal 100, in a different manner than the account information of the terminal A 200A, for which the relationship to the source terminal 100 has not been determined.

For example, outputting the account information of the terminal B 200B in a different manner than the account information of the other terminals may including highlighting a display of the account information of the terminal B 200B.

The reason for highlighting the account information of the terminal B 200B is that in the case when the terminal B 200B is related to the source terminal 100, even when the source terminal 100 arbitrarily changes the settings of the terminal B 200B or outputs content from the source terminal 100 on the terminal B 200B, such a change or output does not go against the will of the user of the terminal B 200B.

Figure 6:
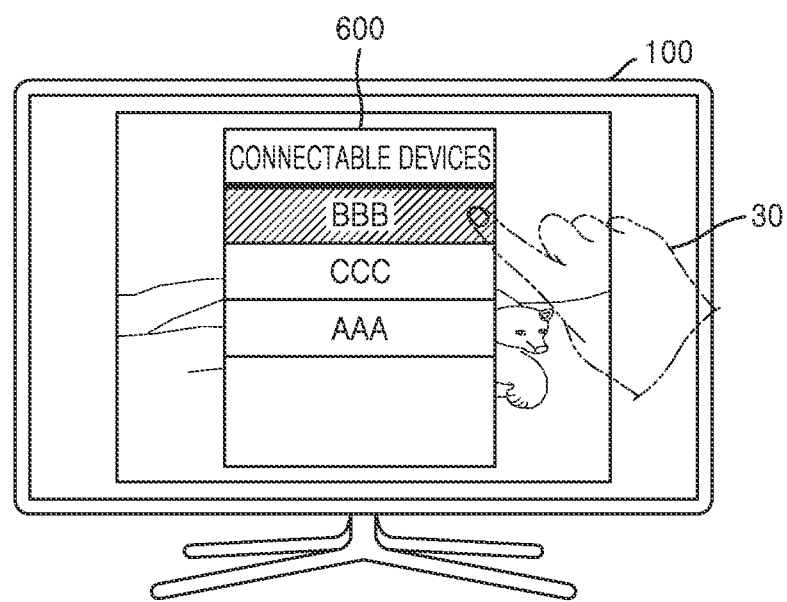
FIG. 6 illustrates a terminal list output on a source terminal, according to an embodiment of the disclosure.

Referring to FIG. 6, when the account information of the terminal B 200B corresponds to the account information of the source terminal 100, the source terminal 100 may set a priority of the terminal B 200B in a terminal list 600 to be higher than priorities of the terminal C 200C and the terminal A 200A. As a result, as shown in FIG. 6, identification information of the terminal B 200B may be placed at the top of the terminal list 600.

In an embodiment of the disclosure, the source terminal 100 highlights the identification information of the terminal B 200B in the terminal list 600 so that the user 30 may recognize that the account information of the terminal B 200B corresponds to the account information of the source terminal 100.

For example, as shown in FIG. 6, the source terminal 100 may shade the identification information of the terminal B 200B. In another example, the source terminal 100 may display the identification information of the terminal B 200B in bolder letters than identification information of the other terminals, or add an emoticon to the identification information of the terminal B 200B.

When the user 30 selects the terminal B 200B from the terminal list 600, a process, performed by the source terminal 100, of establishing a mirroring connection with the terminal B 200B is described with reference to FIG. 7.

Figure 7:
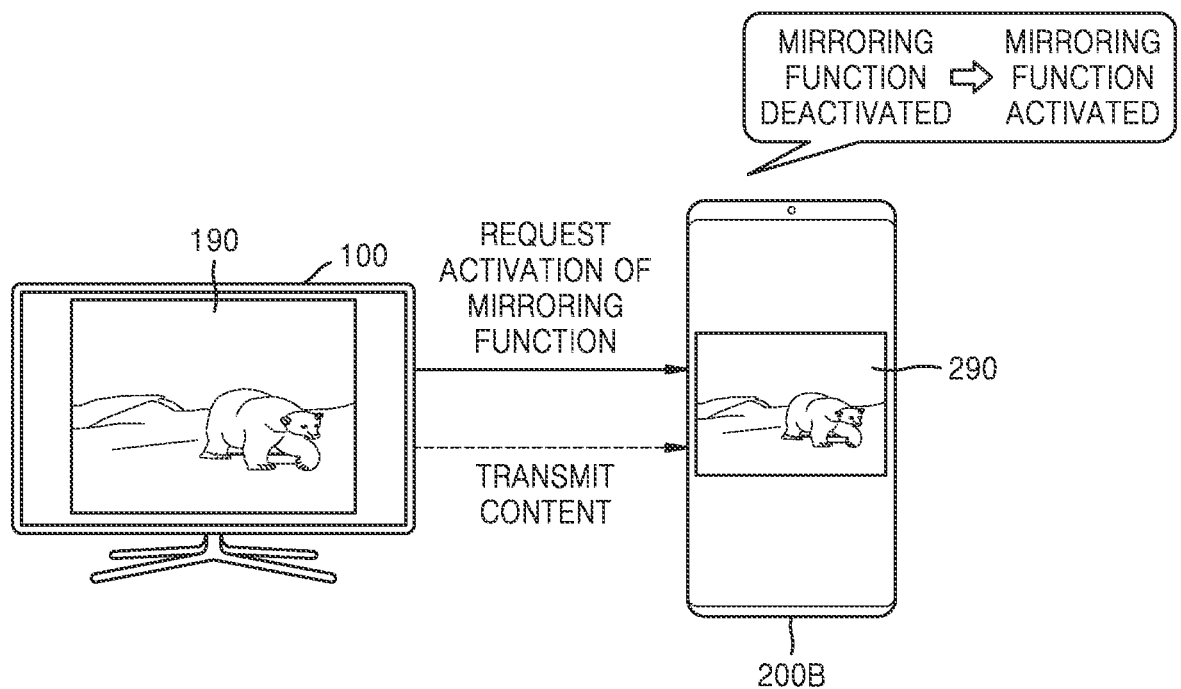
FIG. 7 is a diagram illustrating a process, performed by a source terminal, of transmitting content to a deactivated terminal, according to an embodiment of the disclosure.

FIG. 7 is a diagram illustrating a process, performed by the source terminal 100, of transmitting content to a deactivated terminal, according to an embodiment of the disclosure.

When the terminal B 200B is selected from the terminal list 600, the source terminal 100 may transmit a request for activation of a mirroring function to the terminal B 200B according to the first communication protocol. The terminal B 200B may switch a state of the mirroring function from deactivated to activated in response to a request from the source terminal 100.

When the mirroring function of the terminal B 200B is activated, the source terminal 100 may transmit content 190 (e.g., visual content and/or auditory content), to the terminal B 200B according to the second communication protocol, and the terminal B 200B may output content 290 received from the source terminal 100.

In an embodiment of the disclosure, when the state of the mirroring function of the terminal B 200B is switched from the deactivated state to the activated state, the terminal B 200B may transmit a message indicating that the mirroring function is activated to the source terminal 100 according to the first communication protocol, and when receiving the corresponding message, the source terminal 100 may transmit, to the terminal B 200B, a message requesting establishment of a mirroring connection.

In an embodiment of the disclosure, after transmitting the request for activation of the mirroring function to the terminal B 200B, if a response is not received from the terminal B 200B, the source terminal 100 may repeatedly transmit a message requesting the establishment of a mirroring connection to the terminal B 200B at intervals of a predetermined period. In an example, the source terminal 100 may be configured to transmit N messages at predetermined intervals to terminal B 200B. If a response is not received from terminal B 200B after the N messages are transmitted, the source terminal 100 may display a message indicating that mirroring connection with terminal B 200B has failed.

When the mirroring connection is established with the terminal B 200B, the source terminal 100 may transmit the content 190 to the terminal B 200B.

As seen on FIG. 7, the second communication protocol is used when the source terminal 100 transmits the content 190 to the terminal B 200B. For example, when the mirroring function of the terminal B 200B is activated, the second communication protocol may be used to establish and maintain a mirroring connection with the terminal B 200B in a similar manner as performed for the terminal A 200A.

When the terminal C 200C, which is determined to be unrelated to the source terminal 100, is selected from the terminal list 600, a method of activating the mirroring function of the terminal C 200C is next described.

Figure 8:
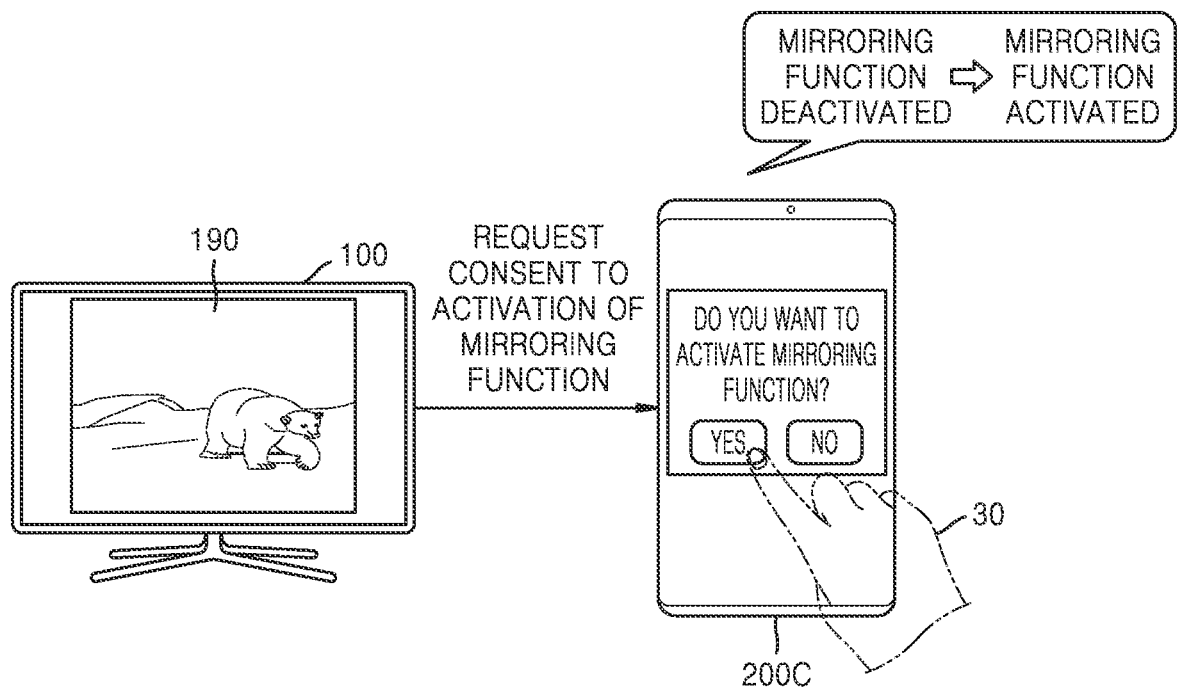
FIG. 8 is a diagram illustrating a method, performed by a source terminal, of activating a mirroring function of a deactivated terminal, according to an embodiment of the disclosure.

FIG. 8 is a diagram illustrating a method, performed by the source terminal 100, of activating a mirroring function of a deactivated terminal, according to an embodiment of the disclosure.

When the terminal C 200C is selected from the terminal list 600, the source terminal 100 may transmit, to the terminal C 200C, a request to consent to activation of a mirroring function according to the first communication protocol. The terminal C 200C may output a message requesting consent to activation of the mirroring function, and when a user 30 consents to the activation of the mirroring function, the terminal C 200C may switch a state of the mirroring function from deactivated to activated.

When the mirroring function of the terminal C 200C is activated, the source terminal 100 may transmit content 190 (e.g., screen data) to the terminal C 200C according to the second communication protocol, and the terminal C 200C may output content received from the source terminal 100.

In an embodiment of the disclosure, when the state of the mirroring function of the terminal C 200C is switched from deactivated to activated, the terminal C 200C may transmit a message indicating that the mirroring function is activated to the source terminal 100 according to the first communication protocol. When receiving the corresponding message, the source terminal 100 may transmit, to the terminal C 200C, a message requesting establishment of a mirroring connection.

In an embodiment of the disclosure, after transmitting, to the terminal C 200C, a message requesting consent to activation of the mirroring function, the source terminal 100 may repeatedly transmit a message requesting the establishment of the mirroring connection to the terminal C 200C at intervals of a predetermined period. This is for a case where a message indicating that the mirroring function is activated is not transmitted from the terminal C 200C to the source terminal 100. In an example, the source terminal 100 may be configured to transmit N messages at predetermined intervals to terminal C 200C. If a response is not received from terminal C 200C after the N messages are transmitted, the source terminal 100 may display a message indicating that activation of the mirroring function in terminal C 200C has failed.

When the mirroring connection is established with the terminal C 200C, the source terminal 100 may transmit the content 190 to the terminal C 200C.

While FIG. 8 shows that the message requesting consent to activation of the mirroring function is output on a display of the terminal C 200C, this configuration merely an example, and in an embodiment of the disclosure, the terminal C 200C may also output the message as a voice.

Because the terminal C 200C is a terminal determined to be unrelated to the source terminal 100, the source terminal 100 may advantageously prevent the mirroring connection from being established against the will of the user 30 of the terminal C 200C by establishing the mirroring connection with the terminal C 200C only when there is consent from the user 30 of the terminal C 200C.

Figure 9:
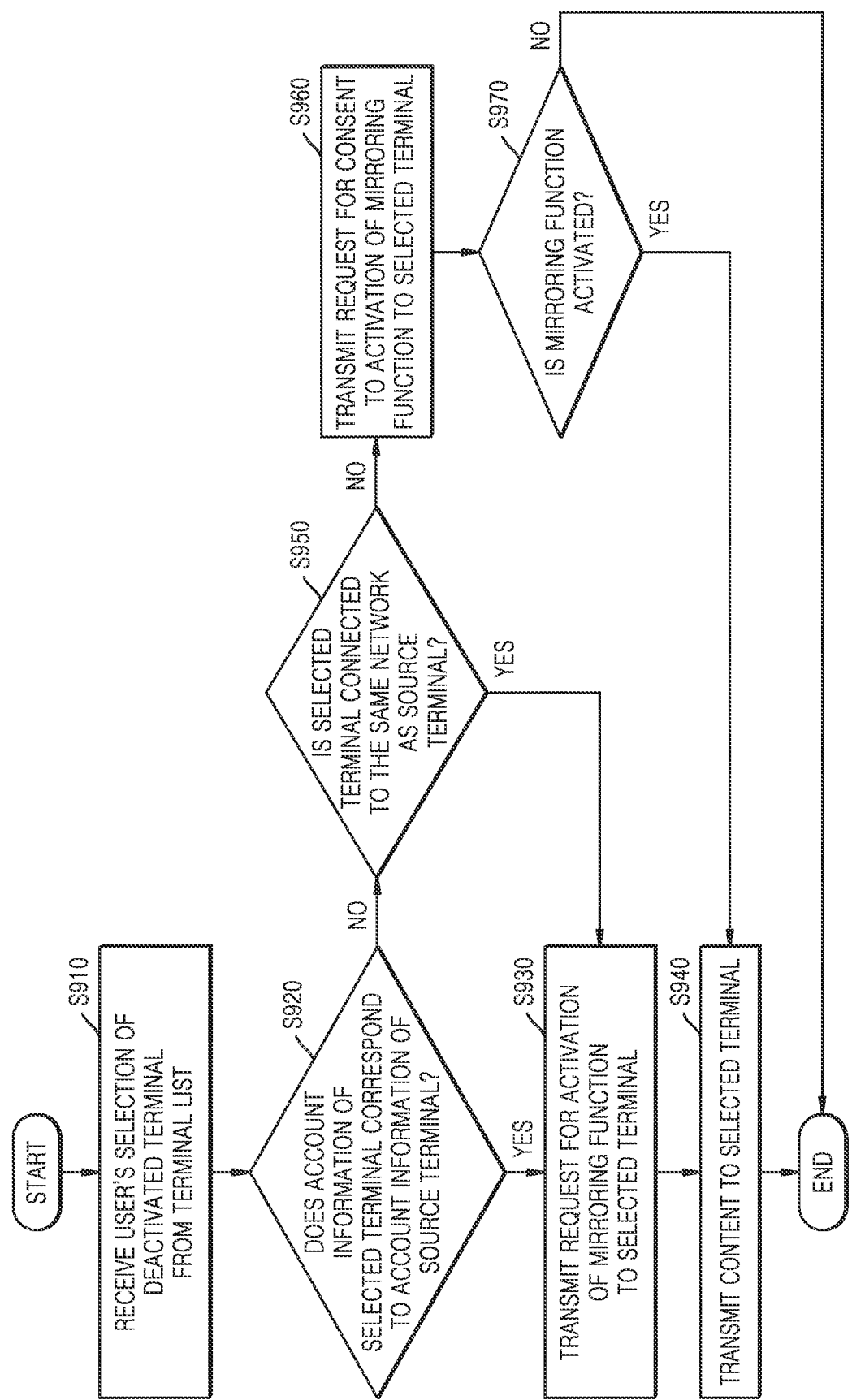
FIG. 9 is a flowchart of a method of activating a mirroring function of a deactivated terminal, according to an embodiment of the disclosure.

FIG. 9 is a flowchart of a method of activating a mirroring function of a deactivated terminal, according to an embodiment of the disclosure.

In operation S910, the source terminal 100 may receive a user's selection of a deactivated terminal from a terminal list.

In operation S920, the source terminal 100 may determine whether account information of the selected terminal corresponds to account information of the source terminal 100.

When the account information of the selected terminal corresponds to the account information of the source terminal 100, in operation S930, the source terminal 100 may transmit a request for activation of a mirroring function to the selected terminal according to the first communication protocol.

When a state of the mirroring function of the selected terminal is switched from deactivated to activated, in operation S940, a mirroring connection may be established between the source terminal 100 and the selected terminal, and the source terminal 100 may transmit content to the selected terminal. The selected terminal may output content received from the source terminal 100 via the output module 230.

When the account information of the selected terminal does not correspond to the account information of the source terminal 100, in operation S950, the source terminal 100 may determine whether the selected terminal is connected to the same network as the source terminal 100.

In an example, a case where the source terminal 100 is connected to the same network as the selected terminal may mean a case where the source terminal 100 and the selected terminal are connected to the same access point (AP). For example, when the source terminal 100 is connected to the selected terminal via the same router, the source terminal 100 may determine that the source terminal 100 and the selected terminal belong to the same network.

When the selected terminal is connected to the same network as the source terminal 100, in operation S930, the source terminal 100 may transmit a request for activation of the mirroring function to the selected terminal, and in operation S940, the source terminal 100 may transmit the content to the selected terminal.

When the selected terminal is not connected to the same network as the source terminal 100, in operation S960, the source terminal 100 may transmit a request for consent to activation of the mirroring function to the selected terminal.

In operation S970, the source terminal 100 may determine whether the mirroring function of the selected terminal is activated, and when the mirroring function of the selected terminal is activated, in operation S940, the source terminal 100 may transmit the content to the selected terminal.

According to the process illustrated in FIG. 9, after determining whether the account information of the selected terminal corresponds to the account information of the source terminal 100, the source terminal 100 may determine whether the selected terminal is connected to the same network as the source terminal 100.

According to an embodiment of the disclosure, the source terminal 100 may first determine whether the selected terminal is connected to the same network as the source terminal 100, and when the selected terminal is not connected to the same network as the source terminal 100, the source terminal 100 may then determine whether the account information of the selected terminal corresponds to the account information of the source terminal 100.

Furthermore, in an embodiment of the disclosure, the source terminal 100 determines only one of whether the selected terminal is connected to the same network as the source terminal 100 and whether the account information of the selected terminal corresponds to the account information of the source terminal 100, and when the selected terminal is not related to the source terminal 100 according to a result of the determination, the source terminal 100 may transmit a request for consent to activation of the mirroring function to the selected terminal as in operation S960.

In an example, the mirroring connection may be established between the source terminal 100 and the terminal B 200B (or terminal C 200C), and the mirroring connection may be terminated while the content is being transmitted from the source terminal 100 to the terminal B 200B (or terminal C 200C) via the mirroring connection.

Because the mirroring function of the terminal B 200B may be initially deactivated due to battery issues, etc., it is necessary to deactivate the mirroring function of the terminal B 200B again when the mirroring connection between the source terminal 100 and the terminal B 200B is terminated. This procedure is described with reference to FIGS. 10 and 11.

Figure 10:
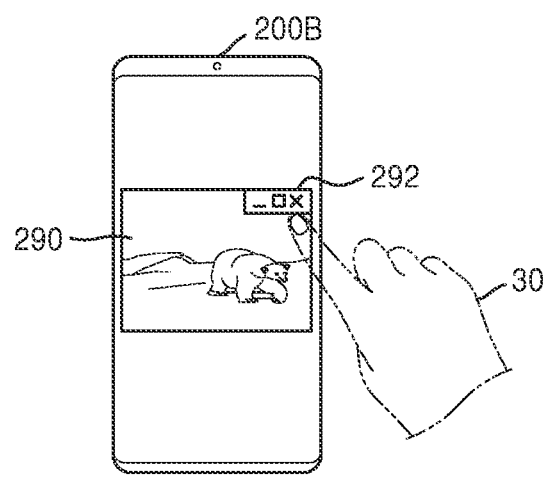
FIG. 10 is a diagram illustrating a situation in which a mirroring connection is terminated, according to an embodiment of the disclosure.

FIG. 10 is a diagram illustrating a situation in which a mirroring connection is terminated, according to an embodiment of the disclosure.

In an embodiment of the disclosure, when an application on the terminal B 200B used to output content 290 is terminated, the mirroring connection between the source terminal 100 and the terminal B 200B may be terminated.

Referring to FIG. 10, the user 30 may select an exit menu 292 in an application used to display the content 290 received from the source terminal 100, and accordingly, the application may be terminated. When the application is terminated, the mirroring connection between the source terminal 100 and the terminal B 200B may be simultaneously terminated.

In an embodiment of the disclosure, when an application used to output the content 190 of the source terminal 100 is terminated on the source terminal 100, or when a mirroring function of the source terminal 100 is deactivated, the mirroring connection between the source terminal 100 and the terminal B 200B may also be terminated.

In an embodiment of the disclosure, the mirroring connection between the source terminal 100 and the terminal B 200B may also be terminated when the state of the mirroring function of the terminal B 200B is switched from activated to deactivated, and in this case, the source terminal 100 may not change the settings of the terminal B 200B because the state of the mirroring function of the terminal B 200B has been switched to deactivated according to the user's choice or any other suitable mechanism for deactivating the mirroring function.

For example, when the application on the terminal B 200B used to output the content 290 received from the source terminal 100 is terminated, when the application used to output the content 190 of the source terminal 100 is terminated on the source terminal 100, and when the mirroring function of the source terminal 100 is deactivated, the source terminal 100 needs to deactivate the mirroring function of the terminal B 200B because the mirroring function of the terminal B 200B remains activated.

Figure 11:
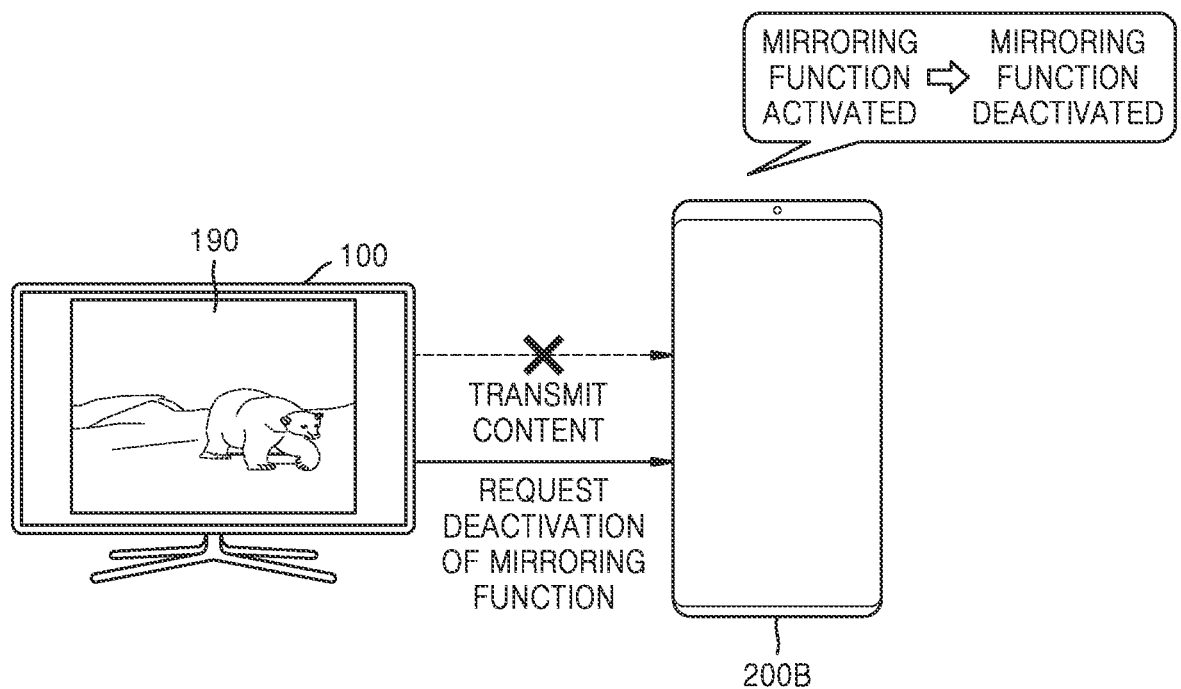
FIG. 11 is a diagram illustrating a method of deactivating a mirroring function of a deactivated terminal after the mirroring function is activated, according to an embodiment of the disclosure.

FIG. 11 is a diagram illustrating a method of deactivating a mirroring function of a deactivated terminal after the mirroring function is activated, according to an embodiment of the disclosure.

When the transmission of the content 190 is stopped according to termination of the mirroring connection with the terminal B 200B, the source terminal 100 may transmit a request for deactivation of the mirroring function to the terminal B 200B according to the first communication protocol. Accordingly, the state of the mirroring function of the terminal B 200B may be switched from activated to deactivated. Thereafter, as described with reference to FIG. 3, the source terminal 100 may search for terminals capable of mirroring connections and output a list of found terminals.

Although FIG. 11 illustrates a situation in which the mirroring connection between the source terminal 100 and the terminal B 200B is terminated, in an embodiment of the disclosure, even in a case where the mirroring connection between the source terminal 100 and the terminal C 200C is terminated, the source terminal 100 may transmit a request for deactivation of the mirroring function to the terminal C 200C according to the first communication protocol. Accordingly, the state of the mirroring function of the terminal C 200C may be switched from activated to deactivated. Therefore, in this situation, even though the mirroring connection between the source terminal 100 and terminal C 200C is disconnected, the source terminal 100 and terminal C 200C may still communicate with each other via the first communication protocol.

Hereinafter, messages transmitted and received between the source terminal 100 and an activated terminal, and messages transmitted and received between the source terminal 100 and a deactivated terminal are described with reference to FIGS. 12 and 13.

Figure 12:
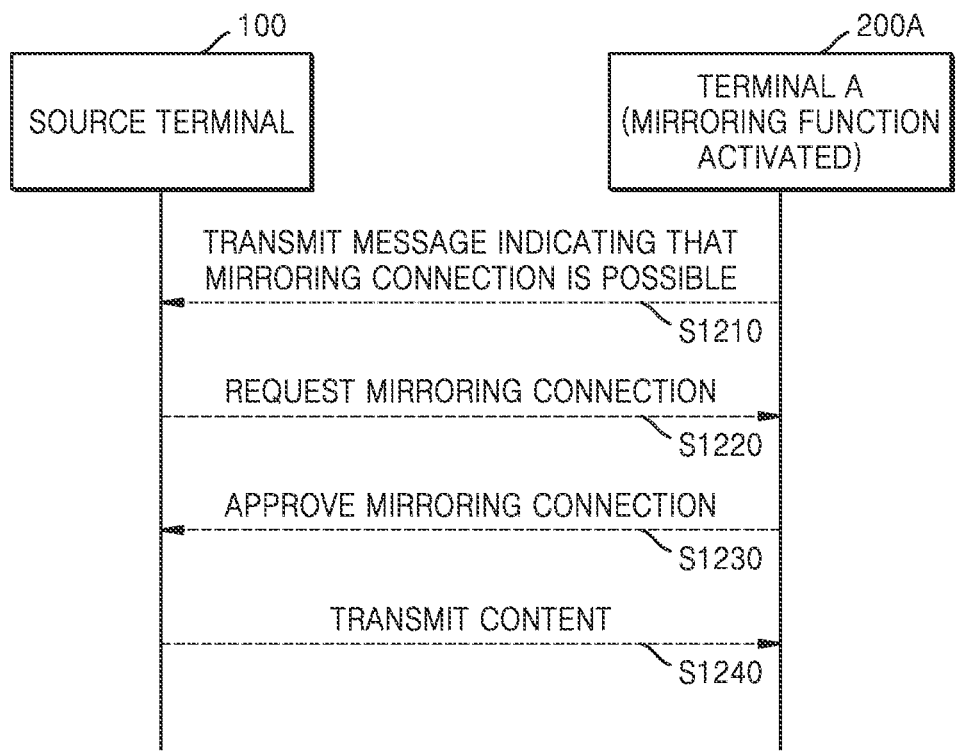
FIG. 12 is a flowchart illustrating messages transmitted and received between a source terminal and an activated terminal, according to an embodiment of the disclosure.

FIG. 12 is a flowchart illustrating messages transmitted and received between the source terminal 100 and an activated terminal, according to an embodiment of the disclosure.

Referring to FIG. 12, in operation S1210, terminal A 200A may transmit, to the source terminal 100, a message indicating that a mirroring connection is possible (e.g., terminal A is equipped with mirroring function). In an example, the terminal A 200A may broadcast the message indicating that the mirroring connection is possible.

Upon receiving the message indicating that the mirroring connection is possible, the source terminal 100 may output a list of terminals capable of the mirroring connection.

When terminal A 200A is selected from the list of terminals, in operation S1220, the source terminal 100 requests a mirroring connection from the terminal A 200A, and in operation S1230, the terminal A 200A may transmit an approval for the mirroring connection to the source terminal 100. The mirroring connection may be established between the source terminal 100 and the terminal A 200A via operations S1220 and S1230.

In operation S1240, the source terminal 100 may transmit content to the terminal A 200A, and the terminal A 200A may output the content received from the source terminal 100.

In an embodiment of the disclosure, the content may include visual content and/or auditory content. The source terminal 100 may encode the content for transmission, and the terminal A 200A may decode the encoded data received from the source terminal 100 to obtain the content.

When the mirroring connection between the source terminal 100 and the terminal A 200A is terminated, the source terminal 100 may stop transmitting content to the terminal A 200A.

The messages illustrated in FIG. 12 may be transmitted and received according to the second communication protocol. As described above, because the terminal A 200A corresponds to an activated terminal, messages may be transmitted and received according to the second communication protocol, as in a mirroring process.

Figure 13:
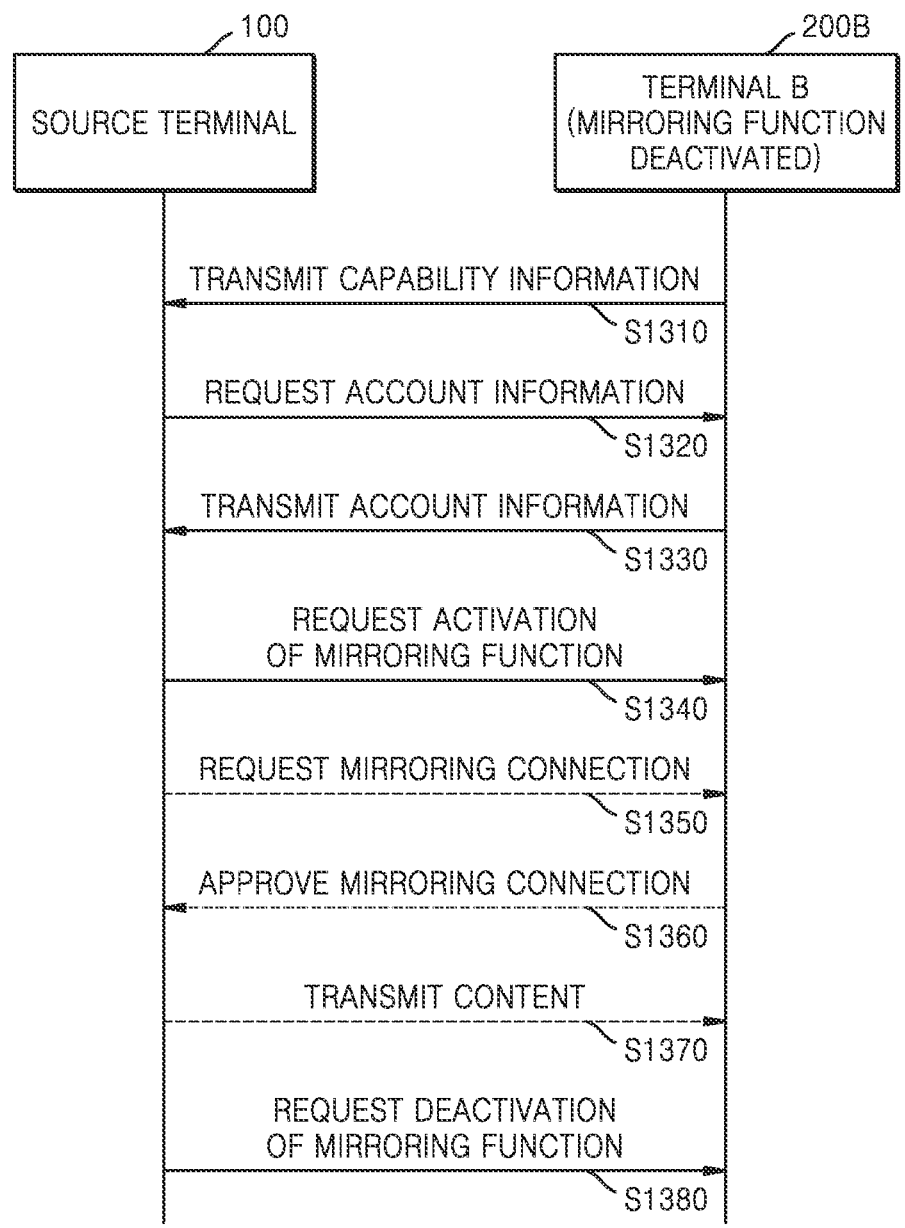
FIG. 13 is a flowchart illustrating messages transmitted and received between a source terminal and a deactivated terminal, according to an embodiment of the disclosure.

FIG. 13 is a flowchart illustrating messages transmitted and received between the source terminal 100 and a deactivated terminal, according to an embodiment of the disclosure.

Referring to FIG. 13, in operation S1310, the terminal B 200B may transmit its capability information to the source terminal 100. In an embodiment of the disclosure, the terminal B 200B may broadcast its capability information.

In operation S1320, the source terminal 100 may request account information from the terminal B 200B, and in operation S1330, the terminal B 200B may transmit its account information to the source terminal 100.

The source terminal 100 may output a terminal list including identification information of the terminal B 200B. In this case, when the account information of the terminal B 200B corresponds to an account of the source terminal 100, the source terminal 100 may output the identification information of the terminal B 200B in a different manner than identification information of other terminals.

When the terminal B 200B is selected from the terminal list, and the account information of the terminal B 200B corresponds to the account of the source terminal 100, in operation S1340, the source terminal 100 may transmit a request for activation of a mirroring function to the terminal B 200B.

In an embodiment of the disclosure, when the terminal B 200B is selected from the terminal list and the account information of the terminal B 200B does not correspond to the account information of the source terminal 100, the source terminal 100 may transmit a request for consent to activation of the mirroring function to the terminal B 200B in operation S1350.

When the mirroring function of the terminal B 200B is activated based on the request for activation of the mirroring function or the request for consent to activation of the mirroring function, in operation S1350, the source terminal 100 may request a mirroring connection from the terminal B 200B, and in operation S1360, the terminal B 200B may transmit an approval for the mirroring connection to the source terminal 100. The mirroring connection may be established between the source terminal 100 and the terminal B 200B via operations S1350 and S1360.

In operation S1370, the source terminal 100 may transmit content to the terminal B 200B, and the terminal B 200B may output the content received from the source terminal 100.

In an embodiment of the disclosure, the content may include visual content and/or auditory content. The source terminal 100 may encode content for transmission, and the terminal B 200B may decode the encoded data received from the source terminal 100 to obtain the content.

When the mirroring connection between the source terminal 100 and the terminal B 200B is terminated, in operation S1380, the source terminal 100 may transmit a request for deactivation of the mirroring function to the terminal B 200B, and the terminal B 200B may switch a state of the mirroring function from activated to deactivated in response to the request for deactivation.

In an embodiment of the disclosure, operations S1310, S1320, S1330, S1340, and S1380 of FIG. 13 may be performed according to the first communication protocol. Furthermore, operations S1350, S1360, and S1370 of FIG. 13 may be performed according to the second communication protocol.

Because operations S1350, S1360, and S1370 of FIG. 13 are included in a mirroring process, these operations may be performed according to the second communication protocol. Furthermore, because operations S1310, S1320, S1330, S1340, and S1380 may not be included in the mirroring process, these operations may be performed according to the first communication protocol different from the second communication protocol.

Figure 14:
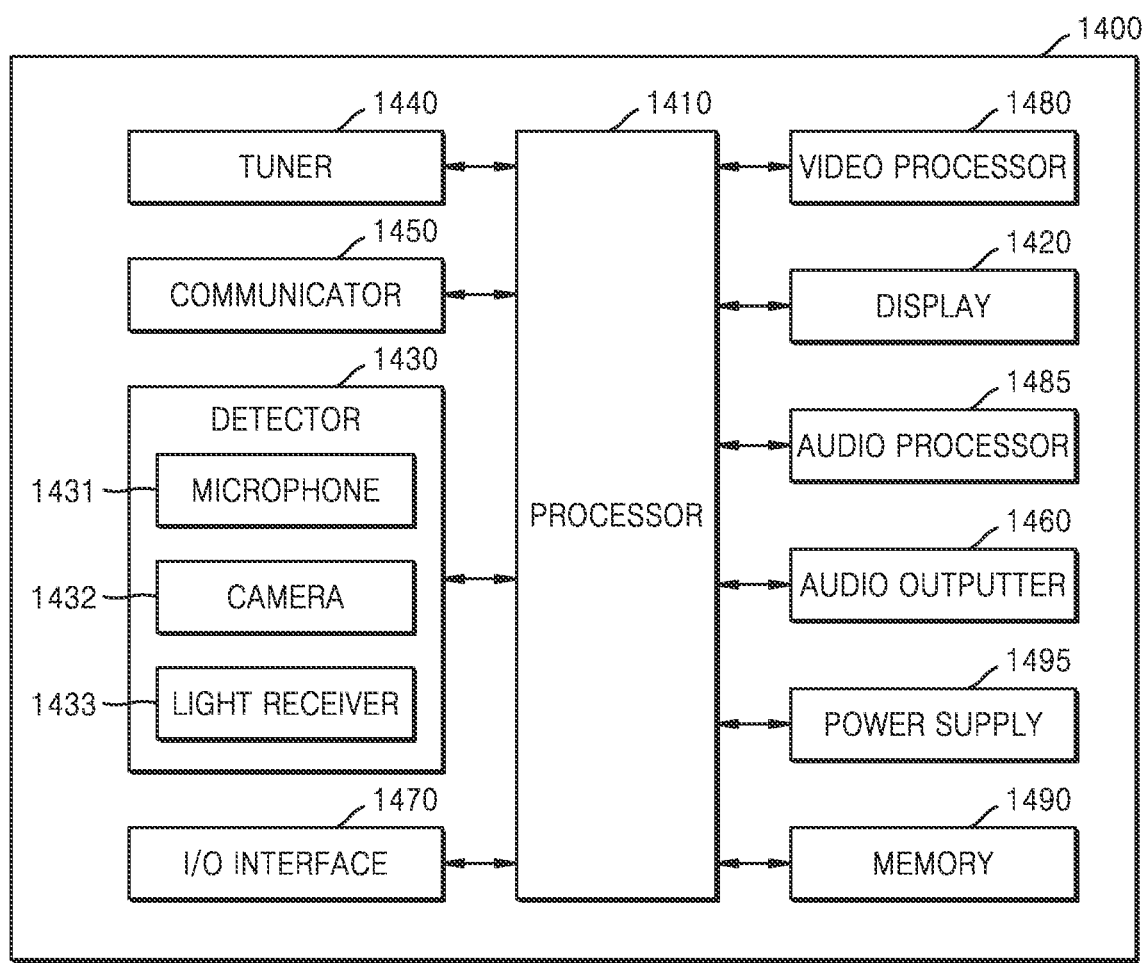
FIG. 14 is a block diagram of a configuration of a terminal device according to an embodiment of the disclosure.

FIG. 14 is a block diagram of a configuration of a terminal device 1400 according to an embodiment of the disclosure.

The terminal device 1400 of FIG. 14 may include the source terminal 100, the activated terminal, or the deactivated terminal described above.

Referring to FIG. 14, the terminal device 1400 according to an embodiment of the disclosure may include a tuner 1440, a processor 1410, a display 1420, a communicator 1450, a detector 1430, an input/output (I/O) interface 1470, and a video processor 1480, an audio processor 1485, an audio outputter 1460, a memory 1490, and a power supply 1495.

According to an embodiment of the disclosure, the tuner 1440 may tune and then select only a frequency of a channel desired to be received among many radio wave components by performing amplification, mixing, resonance, etc. of a broadcast signal received in a wired or wireless manner. The broadcast signal includes audio, video, and additional information (e.g., an electronic program guide (EPG)).

The tuner 1440 may receive broadcast signals from various sources such as terrestrial broadcasting, cable broadcasting, satellite broadcasting, Internet broadcasting, etc. The tuner 1440 may also receive a broadcast signal from a source such as analog broadcasting, digital broadcasting, or any other suitable source.

The detector 1430 detects a user's voice, images, or interactions and may include a microphone 1431, a camera 1432, and a light receiver 1433.

The microphone 1431 may receive a voice uttered by the user. The microphone 1431 may convert the received voice into an electrical signal and output the electrical signal to the processor 1410. The user's voice may include, for example, a voice corresponding to a menu or function of the terminal device 1400.

The camera 1432 may receive an image or a sequence of images (e.g., consecutive frames).

The light receiver 1433 receives an optical signal (including a control signal) from an external control device via a light window on a bezel of the display 1420. The light receiver 1433 may receive, from the control device, an optical signal corresponding to a user input (e.g., touching, pressing, touch gesture, voice, or motion). A control signal may be extracted from the received optical signal according to control by the processor 1410.

The I/O interface 1470 receives, according to control by the processor 1410, video (e.g., a moving image, etc.), audio (e.g., voice, music, etc.), additional information (e.g., EPG, etc.), etc. from outside the terminal device 1400. The I/O interface 1470 may include one of a high-definition multimedia interface (HDMI), a mobile high-definition link (MHL), a universal serial bus (USB), a display port (DP), a Thunderbolt, a video graphics array (VGA) port, an RGB port, a D-subminiature (D-sub), a digital visual interface (DVI), a component jack, and a PC port.

In an example, the processor 1410 controls all operations of the terminal device 1400 and a flow of signals between the internal components of the terminal device 1400 and performs a function of processing data. When there is an input by the user or preset and stored conditions are satisfied, the processor 1410 may execute an operation system (OS) and various applications stored in the memory 1490.

The processor 1410 may include random access memory (RAM) that stores signals or data input from outside the terminal device 1400 or is used as a storage area corresponding to various operations (e.g., image denoising) performed by the terminal device 1400, read-only memory (ROM) that stores a control program for controlling the terminal device 1400, and a processor.

The video processor 1480 processes video data received by the terminal device 1400. The video processor 1480 may perform various types of image processing, such as decoding, scaling, noise removal, frame rate conversion, resolution conversion, etc., on the video data.

The audio processor 1485 processes audio data. The audio processor 1485 may perform various types of processing, such as decoding, amplification, noise removal, etc., on the audio data. Moreover, the audio processor 1485 may include a plurality of audio processing modules to process audio corresponding to a plurality of pieces of content.

The audio outputter 1460 outputs audio contained in a broadcast signal received via the tuner 1440 according to control by the processor 1410. The audio outputter 1460 may output audio (e.g., a voice and a sound) input via the communicator 1450 or the I/O interface 1470. Furthermore, the audio outputter 1460 may output audio stored in the memory 1490 according to control by the processor 1410. The audio outputter 1460 may include at least one of a speaker, a headphone output terminal, or a Sony/Phillips Digital Interface (S/PDIF) output terminal.

The power supply 1495 supplies, according to control by the processor 1410, power input by an external power source to the internal components of the terminal device 1400. The power supply 1495 may also supply, according to control by the processor 1410, power output from one or more batteries located within the terminal device 1400 to the internal components thereof.

The memory 1490 may store various pieces of data, programs, or applications for driving and controlling the terminal device 1400 according to control by the processor 1410. The memory 1490 may include a broadcasting receiving module, a channel control module, a volume control module, a communication control module, a voice recognition module, a motion recognition module, a light receiving module, a display control module, an audio control module, an external input control module, a power control module, a power control module for an external device connected wirelessly (e.g., via Bluetooth), a voice database (DB), or a motion DB. The modules and DBs of the memory 1490 may be implemented in the form of software in order to perform a mirroring function, a broadcast reception control function, a channel control function, a volume control function, a communication control function, a voice recognition function, a motion recognition function, a light receiving control function, a display control function, an audio control function, an external input control function, a power control function, or a power control function of an external device connected wirelessly (e.g., via Bluetooth). The processor 1410 may perform the respective functions by using the software stored in the memory 1490.

Moreover, the block diagram of the terminal device 1400 illustrated in FIG. 14 is a block diagram for an embodiment of the disclosure. The components in the block diagram may be integrated, added, or omitted according to specifications of the terminal device 1400 that is actually implemented. In other words, two or more components may be combined into a single component, or a single component may be subdivided into two or more components when necessary. Furthermore, functions performed in each block are intended to describe embodiments of the disclosure, and a specific operation or device related to the functions does not limit the scope of the disclosure.

A terminal device and a mirroring method performed thereby according to embodiments of the disclosure are to facilitate establishment of a mirroring connection to a terminal with a mirroring function deactivated.

Furthermore, the terminal device and the mirroring method performed thereby according to the embodiments of the disclosure advantageously prevent the mirroring function of a terminal unrelated to a source terminal from being activated against the user's intention.

In addition, the terminal device and the mirroring method performed thereby according to the embodiments of the disclosure advantageously prevent battery consumption of a terminal by deactivating a mirroring function of the terminal after the mirroring function is activated and when a mirroring connection is terminated.

A mirroring method performed by the source terminal 100 according to an embodiment of the disclosure may include identifying, according to a first communication protocol, a first terminal with a mirroring function deactivated.

The mirroring method performed by the source terminal 100 according to the embodiment of the disclosure may include outputting the terminal list 400 or 600 including identification information of the first terminal.

The mirroring method performed by the source terminal 100 according to the embodiment of the disclosure may include, when the first terminal is selected from the terminal list 400 or 600, transmitting a request for activation of the mirroring function to the first terminal according to the first communication protocol.

The mirroring method performed by the source terminal 100 according to the embodiment of the disclosure may include transmitting, according to a second communication protocol, content to the first terminal with the mirroring function activated in response to the request for the activation.

In an embodiment of the disclosure, the identifying of the first terminal may include identifying the first terminal equipped with the mirroring function based on capability information that is received from the first terminal according to the first communication protocol.

In an embodiment of the disclosure, the mirroring method performed by the source terminal 100 may further include identifying, according to the second communication protocol, a second terminal with a mirroring function activated, and the outputting of the terminal list 400 or 600 may include outputting the terminal list 400 or 600 including the identification information of the first terminal and identification information of the second terminal.

In an embodiment of the disclosure, the mirroring method performed by the source terminal 100 may further include receiving account information from the first terminal according to the first communication protocol, and the outputting of the terminal list 400 or 600 may include, when the account information of the first terminal corresponds to account information of the source terminal 100, outputting the identification information of the first terminal differently than the identification information of the second terminal.

In an embodiment of the disclosure, the identification information of the first terminal may be placed in a higher priority than the identification information of the second terminal.

In an embodiment of the disclosure, the first terminal may include a plurality of first terminals, the mirroring method performed by the source terminal 100 may further include receiving pieces of account information from the plurality of first terminals according to the first communication protocol, and the outputting of the terminal list 400 or 600 may include outputting identification information of a first terminal having account information corresponding to the account information of the source terminal 100 differently than identification information of a first terminal having account information not corresponding to the account information of the source terminal 100.

In an embodiment of the disclosure, the transmitting of the request for the activation of the mirroring function to the first terminal may include receiving the account information from the first terminal according to the first communication protocol and, when the account information of the first terminal corresponds to the account information of the source terminal 100, transmitting the request for the activation of the mirroring function to the first terminal.

In an embodiment of the disclosure, the transmitting of the request for the activation of the mirroring function to the first terminal may include, when the account information of the first terminal does not correspond to the account information of the source terminal 100, transmitting a request for consent to the activation of the mirroring function to the first terminal, and the mirroring function of the first terminal may be activated based on an approval by a user of the first terminal.

In an embodiment of the disclosure, the transmitting of the request for the activation of the mirroring function to the first terminal may include, when the first terminal is connected to the same network as the source terminal 100, transmitting the request for the activation of the mirroring function to the first terminal.

In an embodiment of the disclosure, the mirroring method may further include, when a mirroring connection between the source terminal 100 and the first terminal is terminated, transmitting a request for deactivation of the mirroring function to the first terminal according to the first communication protocol.

In an embodiment of the disclosure, the mirroring connection may be terminated when an application used to output the content is terminated on the source terminal 100, when an application used to output the content is terminated on the first terminal, or when the mirroring function is deactivated on the source terminal 100.

A mirroring method performed by the sink terminal 200 according to an embodiment of the disclosure may include transmitting capability information of the sink terminal 200 to the source terminal 100 according to the first communication protocol.

The mirroring method performed by the sink terminal 200 according to the embodiment of the disclosure may include, when the sink terminal 200 is equipped with a mirroring function, receiving a request for activation of the mirroring function from the source terminal 100 according to the first communication protocol.

The mirroring method performed by the sink terminal 200 according to the embodiment of the disclosure may include activating the mirroring function in response to the request for the activation.

The mirroring method performed by the sink terminal 200 according to the embodiment of the disclosure may include receiving content from the source terminal 100 according to the second communication protocol.

The mirroring method performed by the sink terminal 200 according to the embodiment of the disclosure may include outputting the content.

In an embodiment of the disclosure, the mirroring method performed by the sink terminal 200 may further include transmitting account information set on the sink terminal 200 to the source terminal 100 in response to a request from the source terminal 100.

The source terminal 100 for performing mirroring according to an embodiment of the disclosure may include the first communication module 150 configured to identify, according to the first communication protocol, a first terminal with a mirroring function deactivated.

The source terminal 100 for performing mirroring according to the embodiment of the disclosure may include the output module 130 configured to output the terminal list 400 or 600 including identification information of the first terminal.

The source terminal 100 for performing mirroring according to the embodiment of the disclosure may include the second communication module 170 configured to perform communication according to the second communication protocol.

According to an embodiment of the disclosure, the first communication module 150 of the source terminal 100 for performing mirroring may be configured to, when the first terminal is selected from the terminal list 400 or 600, transmit a request for activation of the mirroring function to the first terminal according to the first communication protocol.

According to an embodiment of the disclosure, the second communication module 170 of the source terminal 100 for performing mirroring may be configured to transmit, according to the second communication protocol, content to the first terminal with the mirroring function activated in response to the request for the activation.

According to an embodiment of the disclosure, the first communication module 150 of the source terminal 100 for performing mirroring may be configured to identify the first terminal equipped with the mirroring function based on capability information received from the first terminal.

According to an embodiment of the disclosure, the second communication module 170 of the source terminal 100 for performing mirroring may be configured to identify, according to the second communication protocol, a second terminal with a mirroring function activated, and the output module 130 may be configured to output the terminal list 400 or 600 including the identification information of the first terminal and identification information of the second terminal.

According to an embodiment of the disclosure, the first communication module 150 of the source terminal 100 for performing mirroring may be configured to receive account information from the first terminal according to the first communication protocol, and the output module 130 may be configured to, when the account information of the first terminal corresponds to account information of the source terminal 100, output the identification information of the first terminal differently than the identification information of the second terminal.

In an embodiment of the disclosure, the first terminal may include a plurality of first terminals, the first communication module 150 of the source terminal 100 may be configured to receive pieces of account information from the plurality of first terminals according to the first communication protocol, and the output module 130 may be configured to output identification information of a first terminal having account information corresponding to the account information of the source terminal 100 differently than identification information of a first terminal having account information not corresponding to the account information of the source terminal 100.

According to an embodiment of the disclosure, the first communication module 150 of the source terminal 100 for performing mirroring may be configured to receive the account information from the first terminal according to the first communication protocol and, when the account information of the first terminal corresponds to the account information of the source terminal 100, transmit the request for the activation of the mirroring function to the first terminal.

A terminal device and a mirroring method performed thereby according to embodiments of the disclosure may facilitate establishment of a mirroring connection to a terminal with a mirroring function deactivated.

The terminal device and the mirroring method performed thereby according to the embodiments of the disclosure may advantageously prevent a mirroring function of a terminal unrelated to a source terminal from being activated against a user's intention.

The terminal device and the mirroring method performed thereby according to the embodiments of the disclosure may advantageously prevent battery consumption of a terminal by deactivating a mirroring function of the terminal after the mirroring function is activated and when a mirroring connection is terminated.

The above-described embodiments of the disclosure may be written as computer-executable programs that may be stored in a machine-readable storage medium.

A machine-readable storage medium may be provided in the form of a non-transitory storage medium. In this regard, the term 'non-transitory storage medium' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer for temporarily storing data.

According to an embodiment of the disclosure, methods according to the embodiments of the disclosure may be included in a computer program product when provided. The computer program product may be traded, as a product, between a seller and a buyer. The computer program product may be distributed in the form of a computer-readable storage medium (e.g., compact disc (CD)-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the computer-readable storage medium such as a memory of a server of a manufacturer, a server of an application store, or a relay server.

While certain embodiments of the disclosure have been described in detail, the disclosure is not limited to the above embodiments thereof, and various modifications and changes may be made by one of ordinary skill in the art within the scope of the technical idea of the disclosure.

The invention claimed is:

1. A mirroring method performed by a source terminal, the mirroring method comprising:
   identifying, according to a first communication protocol, a first terminal having a mirroring function that is deactivated;
   outputting a terminal list comprising identification information of the first terminal;
   based on the first terminal being selected from the terminal list, transmitting a request for activation of the mirroring function to the first terminal according to the first communication protocol; and
   transmitting, according to a second communication protocol that is different from the first communication protocol, content to the first terminal with the mirroring function that is activated in response to the request for the activation.

2. The mirroring method of claim 1, wherein the identifying the first terminal comprises identifying the first terminal having the mirroring function based on capability information that is received from the first terminal according to the first communication protocol.

3. The mirroring method of claim 1, further comprising:
   identifying, according to the second communication protocol, a second terminal having the mirroring function that is activated,
   wherein the outputting the terminal list comprises:
      outputting the terminal list comprising the identification information of the first terminal and identification information of the second terminal.

4. The mirroring method of claim 3, further comprising:
   receiving account information of the first terminal from the first terminal according to the first communication protocol,
   wherein the outputting the terminal list comprises:
      based on the account information of the first terminal corresponding to account information of the source terminal, outputting the identification information of the first terminal differently than the identification information of the second terminal such that a display of the identification information of the first terminal is different from a display of the identification information of the second terminal.

5. The mirroring method of claim 4, wherein the identification information of the first terminal is placed in the terminal list such that the identification information of the first terminal has a higher priority than the identification information of the second terminal.

6. The mirroring method of claim 1, wherein the first terminal comprises a plurality of first terminals, and
   wherein the mirroring method further comprises:
      receiving one or more pieces of account information from the plurality of first terminals according to the first communication protocol, and
   wherein the outputting the terminal list comprises:
      outputting identification information of a first terminal, from among the plurality of first terminals, having account information corresponding to the account information of the source terminal differently than identification information of a first terminal, from among the plurality of first terminals, having account information not corresponding to the account information of the source terminal such that a display of the identification information of the first terminal having the corresponding account information is different from a display of the identification information of the first terminal that does not have the corresponding account information.

7. The mirroring method of claim 1, wherein the transmitting the request for the activation of the mirroring function to the first terminal comprises:
receiving the account information of the first terminal from the first terminal according to the first communication protocol, and
based on the account information of the first terminal corresponding to the account information of the source terminal, transmitting the request for the activation of the mirroring function to the first terminal.

8. The mirroring method of claim 7, wherein the transmitting the request for the activation of the mirroring function to the first terminal comprises:
based on the account information of the first terminal not corresponding to the account information of the source terminal, transmitting a request for consent to the activation of the mirroring function to the first terminal, and
wherein the mirroring function of the first terminal is activated according to an approval by a user of the first terminal.

9. The mirroring method of claim 1, wherein the transmitting the request for the activation of the mirroring function to the first terminal comprises, based on the first terminal being connected to a same network as the source terminal, transmitting the request for the activation of the mirroring function to the first terminal.

10. The mirroring method of claim 1, further comprising, based on a mirroring connection between the source terminal and the first terminal being terminated, transmitting a request for deactivation of the mirroring function to the first terminal according to the first communication protocol.

11. The mirroring method of claim 10, wherein the mirroring connection is terminated based on an application used to output the content being terminated on the source terminal, based on an application used to output the content being terminated on the first terminal, or based on the mirroring function being deactivated on the source terminal.

12. A non-transitory computer-readable medium having instructions stored therein, which when executed by a processor cause the processor to execute the mirroring method of any one of claim 1.

13. The mirroring method according to claim 1, further comprising:
after the mirroring function of the first terminal is activated, transmitting, according to the second communication protocol, a request to establish a mirroring connection with the first terminal to the first terminal.

14. A mirroring method performed by a sink terminal, the mirroring method comprising:
transmitting capability information of the sink terminal to a source terminal according to a first communication protocol;
based on the sink terminal having a mirroring function, receiving a request for activation of the mirroring function from the source terminal according to the first communication protocol;
activating the mirroring function based on the request for the activation;
receiving content from the source terminal according to a second communication protocol that is different from the first communication protocol; and
outputting the content.

15. The mirroring method of claim 14, further comprising, based on a request from the source terminal, transmitting account information set on the sink terminal to the source terminal.

16. The mirroring method according to claim 14, further comprising:
after the mirroring function is activated, receiving, according to the second communication protocol, a request to establish a mirroring connection with the sink terminal from the source terminal.

17. A source terminal for performing mirroring, the source terminal comprising:
first communication circuitry;
second communication circuitry;
memory storing one of more instructions; and
a processor operatively coupled to the first communication circuitry, the second communication circuitry, and the memory and configured to execute the one or more instructions in the memory,
wherein the one or more instructions, when executed by the processor, cause the source terminal to:
identify, via the first communication circuitry according to a first communication protocol, a first terminal having a mirroring function that is deactivated,
output a terminal list comprising identification information of the first terminal,
based on the first terminal being selected from the terminal list, transmit, via the first communication circuitry according to the first communication protocol, a request for activation of the mirroring function to the first terminal, and
transmit, via the second communication circuitry according to a second communication protocol that is different from the first communication protocol, content to the first terminal having the mirroring function that is activated in response to the request for the activation.

18. The source terminal of claim 17, wherein the one or more instructions, when executed by the processor, cause the source terminal to:
identify the first terminal having the mirroring function based on capability information received from the first terminal.

19. The source terminal of claim 17, wherein the one or more instructions, when executed by the processor, cause the source terminal to:
identify, via the second communication circuitry according to the second communication protocol, a second terminal having the mirroring function that is activated, and
output the terminal list comprising the identification information of the first terminal and identification information of the second terminal.

20. The source terminal of claim 19, wherein the one or more instructions, when executed by the processor, cause the source terminal to:
receive, via the first communication circuitry according to the first communication protocol, account information from the first terminal, and
based on the account information of the first terminal corresponding to account information of the source terminal, output the identification information of the first terminal differently than the identification information of the second terminal.

21. The source terminal of claim 17, wherein the first terminal comprises a plurality of first terminals,
   wherein the one or more instructions, when executed by the processor, cause the source terminal to:
      receive, via the first communication circuitry according to the first communication protocol, receive one or more pieces of account information from the plurality of first terminals, and
      output identification information of a first terminal, from among the plurality of first terminals, having account information corresponding to the account information of the source terminal differently than identification information of a first terminal, from among the plurality of first terminals, having account information not corresponding to the account information of the source terminal such that a display of the identification information of the first terminal having the corresponding account information is different from a display of the identification of the first terminal that does not have the corresponding account information.

22. The source terminal of claim 17, wherein the one or more instructions, when executed by the processor, cause the source terminal to:
   receive, via the first communication circuitry according to the first communication protocol, the account information from the first terminal, and
   based on the account information of the first terminal corresponding to the account information of the source terminal, transmit the request for the activation of the mirroring function to the first terminal.

23. The source terminal according to claim 17, wherein the one or more the one or more instructions, when executed by the processor, cause the source terminal to:
   after the mirroring function of the first terminal is activated, transmit, via the second communication circuitry according to the second communication protocol, to the first terminal a request to establish a mirroring connection with the first terminal.

* * * * *